US008526275B1

(12) United States Patent
Yuan et al.

(10) Patent No.: US 8,526,275 B1
(45) Date of Patent: Sep. 3, 2013

(54) SYSTEMS AND METHODS FOR DISSIPATING HEAT FROM A NEAR-FIELD TRANSDUCER IN AN ENERGY ASSISTED MAGNETIC RECORDING ASSEMBLY

(75) Inventors: Hongxing Yuan, San Ramon, CA (US); Zhongyan Wang, San Ramon, CA (US); Wentao Yan, Fremont, CA (US); Yanfeng Chen, San Ramon, CA (US); Matthew R. Gibbons, San Jose, CA (US); Zhong Shi, Dublin, CA (US)

(73) Assignee: Westerni Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/458,949

(22) Filed: Apr. 27, 2012

(51) Int. Cl.
*G11B 11/00* (2006.01)

(52) U.S. Cl.
USPC .................. 369/13.33; 369/13.32; 369/13.22; 369/13.24; 369/13.14

(58) Field of Classification Search
None
See application file for complete search history.

(56) References Cited

U.S. PATENT DOCUMENTS

| 4,667,395 | A | 5/1987 | Ahlgren et al. |
| 5,994,747 | A | 11/1999 | Wu |
| 6,746,877 | B1 | 6/2004 | Hornik et al. |
| 6,795,630 | B2 | 9/2004 | Challener et al. |
| 7,272,079 | B2 | 9/2007 | Challener |
| 7,500,255 | B2 | 3/2009 | Seigler et al. |
| 7,885,029 | B2 | 2/2011 | Miyauchi et al. |
| 7,996,986 | B2 * | 8/2011 | Gokemeijer ..................... 29/737 |
| 8,164,855 | B1 | 4/2012 | Gibbons et al. |
| 8,248,891 | B2 | 8/2012 | Lee et al. |
| 8,320,220 | B1 | 11/2012 | Yuan et al. |
| 2003/0137772 | A1 | 7/2003 | Challener |
| 2007/0139818 | A1 * | 6/2007 | Shimazawa et al. .......... 360/126 |
| 2008/0068748 | A1 | 3/2008 | Olson et al. |
| 2009/0073858 | A1 | 3/2009 | Seigler et al. |
| 2010/0061199 | A1 | 3/2010 | Hirara et al. |
| 2010/0104768 | A1 | 4/2010 | Xiao et al. |
| 2010/0123965 | A1 | 5/2010 | Lee et al. |
| 2010/0123967 | A1 | 5/2010 | Batra et al. |
| 2010/0157745 | A1 | 6/2010 | Okada et al. |
| 2010/0214685 | A1 | 8/2010 | Seigler et al. |

\* cited by examiner

*Primary Examiner* — Muhammad N Edun

(57) ABSTRACT

Embodiments of the present invention are directed to a recording head for energy assisted magnetic recording. The recording head includes a near-field transducer (NFT) having a preselected shape and a surface, a writing pole on the NFT, and a non-metal heat dissipator positioned between the NFT surface and the writing pole. The non-metal heat dissipator includes a first portion in contact with the NFT surface, the first portion extending beyond an edge of the NFT surface in a first direction substantially perpendicular to an air bearing surface (ABS) and parallel to the NFT surface.

32 Claims, 8 Drawing Sheets

SYSTEMS AND METHODS FOR DISSIPATING HEAT FROM A NEAR-FIELD TRANSDUCER IN AN ENERGY ASSISTED MAGNETIC RECORDING ASSEMBLY

FIELD

Aspects of the present invention relate to an energy assisted magnetic recording (EAMR), and, in particular, to systems and methods for dissipating heat from a near-field transducer in an EAMR assembly.

BACKGROUND

With current perpendicular magnetic recording technology, the magnetic recording areal density has reached around 700 to 800 Gb/in$^2$, which is reaching the physical upper limit due to the superparamagnetic effect. In hard disk drives, the superparamagnetic effect sets a limit on the storage density due to the minimum size of magnetic domain that can be used in a magnetic recording medium. Although magnetic materials with higher coercivity such as FePt, CoPd, etc. are available, these materials generally have poor writability as a result of insufficiencies in the writing field of conventional writing heads.

Energy assisted magnetic recording (EAMR) or heat assisted magnetic recording (HAMR) technology has become the common pursuit in the field of data storage art because it is one of the most promising solutions to circumvent the above described writability problem and further push the data areal density to 1 Tbit/in$^2$ and beyond.

In an EAMR system, a light coupler, a waveguide, and a near-field transducer (NFT) are generally inserted between a reader and a writer. The light that is coupled from an integrated or an attached external light source propagates along the waveguide and focuses on a small area close to the air bearing surface (ABS) of a slider where the NFT is located, and in the neighborhood of the waveguide. The NFT is a strong absorber of light waves at resonant status assisted by a surface plasmon effect. Therefore, the NFT is capable of squeezing or concentrating the light energy to a very tiny area (e.g., 40 nm) and acts as a relay to deliver the concentrated energy to the recording layer of a recording medium, which is positioned only several nanometers away within the near-field zone of the NFT. With the concentrated light energy, the recording medium can be temporarily heated up and becomes magnetically soft such that a writing magnetic field can flip the magnetic direction of the medium in the heated area to store the desired bit data.

In the EAMR system, the NFT absorption at resonant status is very strong, and the generated heat is confined within a very tiny region. Therefore, the temperature of the NFT can be very high and can even be higher than the melting point of the NFT material. That can lead to non-reversible plastic deformation of the NFT, and portions of the NFT material may be pushed outward, resulting in burnishing. Eventually, both the NFT and the recording medium can be damaged. Therefore, it is important to prevent the temperature of the NFT from increasing too high and to prevent potential NFT and/or recording medium damage. The conventional method is to equip the EAMR head with a metal heatsink or chimney made of a material having relatively high thermal conductivity such as Au, Cu, Al, etc.

Although the metal heatsink can help to prolong the lifetime of the NFT to some extent, the metal heatsink still has several drawbacks. First, the metal heatsink generally provides a relatively narrow heat channel to carry the heat accumulated in the NFT away through a writing pole. Nevertheless, the writing pole itself also absorbs light energy from an adjacent waveguide and forms an additional undesirable heat source. Furthermore, the writing pole itself is not a very good heat conductor.

Second, the metal heatsink generally cannot be larger than the NFT, otherwise the NFT performance will deteriorate substantially. Therefore, the heat capacity of the metal heatsink itself is quite limited. Third, there is a significant risk of damaging the NFT during the process of fabricating the metal heatsink because it is smaller than the NFT. In order to avoid damaging the NFT, additional stop layer(s) (e.g., Cr, Ni, Ra, etc.) are often added between the NFT and the heatsink during fabrication of the EAMR head. However, the existence of the stop layers has a considerable negative impact to the optical performance of the NFT, and the thermal performance of the stop layers can be even worse than the metal heatsink since these materials are very absorptive. In the related art, the metal heatsink typically will naturally form a conical shape that results in a smaller contact area of contact between the NFT and the metal heatsink. As such, the heat dissipation rate will be poor. Therefore, it is desirable to provide an EAMR head with improved heatsink performance for EAMR applications.

SUMMARY

According to an embodiment of the present invention, a recording head for energy assisted magnetic recording includes a near-field transducer (NFT) having a preselected shape and a surface, a writing pole on the NFT, and a non-metal heat dissipator positioned between the NFT surface and the writing pole. In one embodiment, the non-metal heat dissipator includes a first portion in contact with the NFT surface, and the first portion extends beyond an edge of the NFT surface in a first direction that is substantially perpendicular to an air bearing surface (ABS) and parallel to the NFT surface.

According to another embodiment of the present invention, a method for fabricating a recording head for energy assisted magnetic recording is provided. The method includes forming a near-field transducer (NFT) having a preselected shape and a surface; forming a non-metal heat dissipator on the NFT, the non-metal heat dissipator including a first portion in contact with the NFT surface, the first portion extending beyond an edge of the NFT surface in a first direction substantially perpendicular to an air bearing surface (ABS) and parallel to the NFT surface; and forming a writing pole on the non-metal heat dissipator.

In one embodiment, the method may further include forming a waveguide core adjacent to the NFT, wherein the second portion of the non-metal heat dissipator is at least about 600 nm away from the waveguide core. In one embodiment, the method may further include forming a magnetic yoke connected with the writing pole, wherein the non-metal heat dissipator is in contact with the magnetic yoke.

BRIEF DESCRIPTION OF THE DRAWINGS

The above and other features and aspects of the present invention will become more apparent by describing in detail embodiments thereof with reference to the attached drawings in which:

FIGS. 2b and 2c are a top view and a side view, respectively, of the EAMR head of FIG. 2a.

DETAILED DESCRIPTION

In an energy assisted magnetic recording (EAMR) system, the near field transducer (NFT) couples the light from a waveguide, focuses the light to a nano-sized highly concentrated optical spot, and delivers the energy to a magnetic recording medium to achieve EAMR writing or recording. The reliability of the NFT will often directly determine the lifetime of an EAMR head (e.g., slider) and a hard drive including the same. Due to the strong absorption of light energy by the NFT resulting from resonant local surface plasmon (LSP), the NFT can become very hot during its operation. Therefore, the NFT is typically cooled by a heatsink, which can be a key element to enable the NFT to survive its working environment.

Embodiments of the present invention are directed to a non-metal heatsink formed with, for example, a dielectric material having a relatively high thermal conductivity (e.g., AlN, BN, and other suitable non-metal materials) to replace the limited metal heatsinks used in the related art. The non-metal heatsink includes a heat-channel portion, which covers a surface of the NFT and acts as a heat relay, and optionally a heat reservoir portion that can temporarily store heat. While not limited to any particular theory, the non-metal heat-channel portion can be much larger than a typical metal heatsink because the heat-channel portion has limited impact on NFT optical performance due to the dielectric nature of the non-metal heat-channel portion. Thus, the heat capacity of the heat-channel portion together with the optional heat reservoir can be much larger than a typical NFT metal heatsink. Therefore, the non-metal heatsink can reduce the temperature of the NFT more than that of a conventional metal heatsink.

In several embodiments of the present invention, the NFT temperature can be reduced to a level that is about 65% less than that of a comparative example with no heatsink, and about 30% less than that of an NFT cooled by a conventional metal heatsink. Besides this merit, the non-metal heatsink still has several other desirable features. For example, the impact to NFT performance can be minimized or reduced considering the nature of surface plasmon resonance in the NFT because the non-metal heatsink is made of a non-absorptive material. In addition, the re-optimized NFT is even more efficient, e.g., up to 12% to 15%, in delivering light energy into the magnetic recording medium. The use of the non-metal heatsink can also remove or reduce the risk of damaging the NFT during a milling process for fabricating the metal heat sink that has to be milled to a size smaller than that of the NFT. Further, the additional processes for forming the absorptive metal stop layer can be avoided when the metal heatsink is replaced by the non-metal heatsink in many of the embodiments of the present invention. In several embodiments, the optional heat reservoir can be linked or connected to a magnetic yoke to dissipate the heat from NFT.

Figure 1:
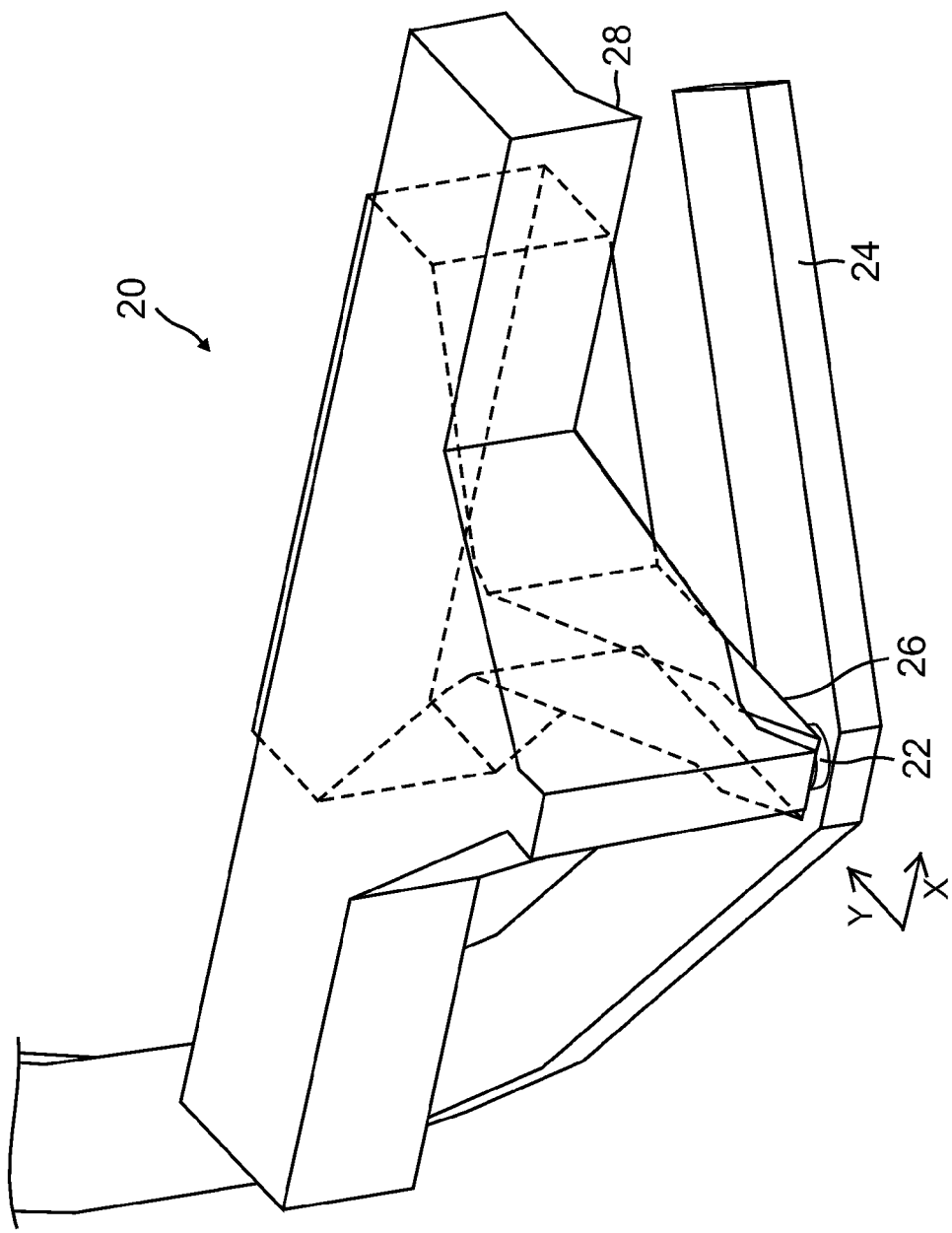
FIG. 1 is a perspective view illustrating a relevant portion of an EAMR head including an NFT with a non-metal heatsink according to one embodiment of the present invention.

FIG. 1 is a perspective view illustrating a relevant portion of an EAMR head 20 including an NFT with a non-metal heatsink according to one embodiment of the present invention. In FIG. 1, only some components of the EAMR head 20 relevant to the discussion of the present embodiment are illustrated, while other components commonly known in the art are omitted for clarity. In this embodiment, an NFT 22 is formed on a waveguide 24 (e.g., a waveguide core), a non-metal heatsink 26 is formed on a surface of the NFT 22, and a writing pole 28 is formed on both the NFT 22 and the non-metal heatsink 26. Here, the non-metal heatsink 26 is between the writing pole 28 and the NFT surface (e.g., top surface of cylindrical shaped NFT 22). The non-metal heatsink 26 is much larger than the surface of the NFT 22. For example, the non-metal heatsink 26 extends substantially beyond an edge of the NFT surface in a first direction (e.g., Y direction in FIG. 1) that is substantially perpendicular to an air bearing surface (ABS) (e.g., X direction in FIG. 1) and parallel to the NFT surface in contact with the non-metal heatsink 26.

The use of the non-metal heatsink 26 in the embodiment of FIG. 1 can overcome some of the limitations of an EAMR head with a metal heatsink in the related art. With the non-metal heatsink 26, no stop layer needs to be formed between the NFT 22 and the non-metal heatsink 26. Therefore, potential damage to the NFT 22 during the fabrication of the metal heatsink can be avoided. In this embodiment, the non-metal heatsink 26 can be formed directly on the NFT 22 with any suitable processes that are generally known in the art.

Figure 2A:
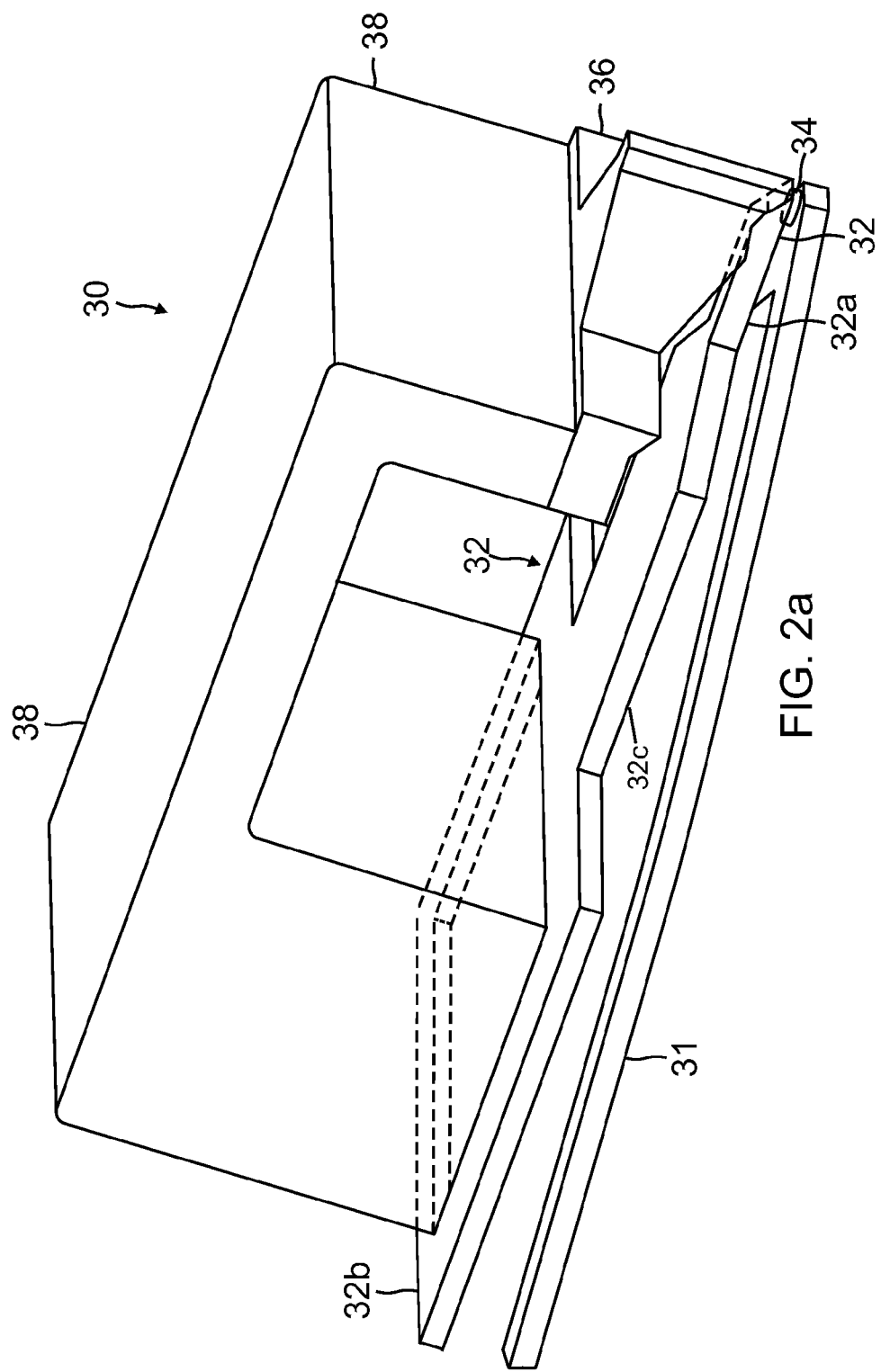
FIG. 2a is a perspective view of an EAMR head including an NFT with a non-metal heatsink according to a second embodiment of the present invention.
Figure 2B:
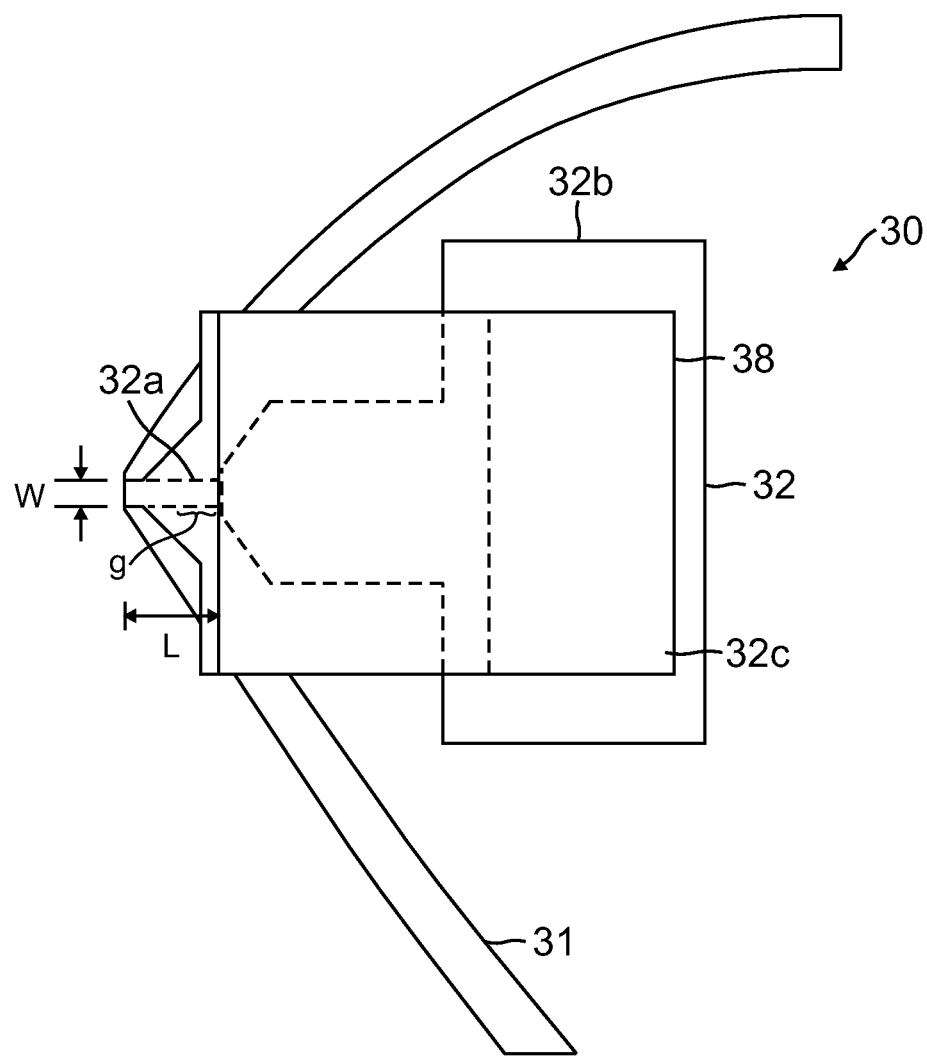
Figure 2C:
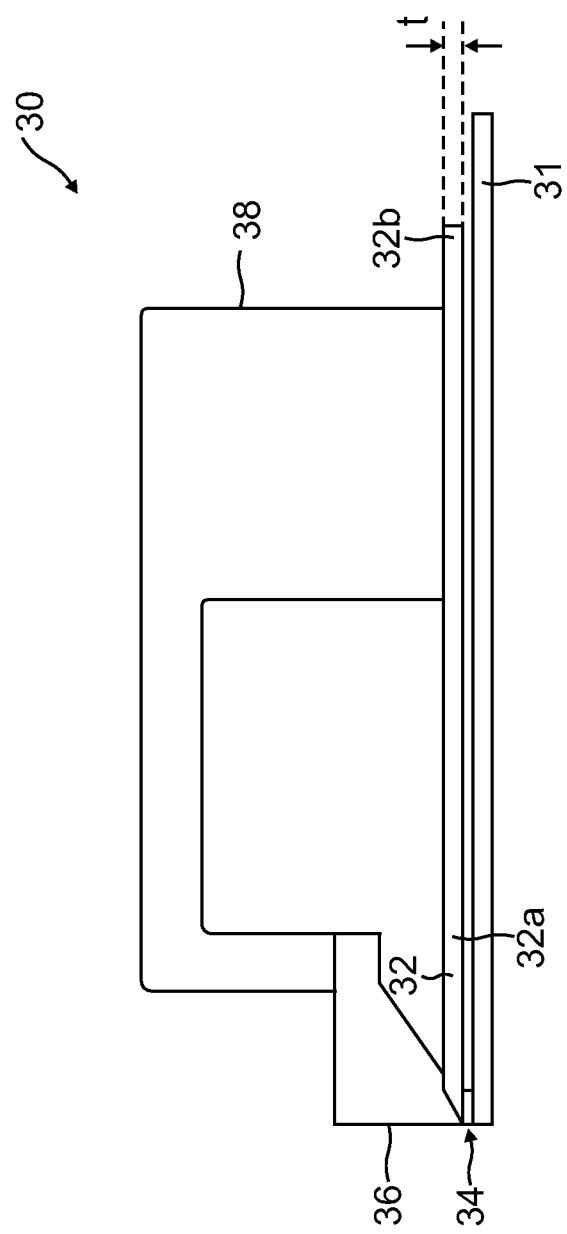

FIG. 2a is a perspective view of an EAMR head 30 including an NFT with a non-metal heatsink according to a second embodiment of the present invention. FIGS. 2b and 2c are a top view and a side view, respectively, of the EAMR head 30 of FIG. 2a. Referring to FIGS. 2a-2c, an NFT 34 is formed on a waveguide 31, and a non-metal heatsink 32 is formed between the NFT 34 and a writing pole 36. Generally, a spacer layer is positioned between the NFT 34 and the waveguide 31 and can be formed of a cladding material. The non-metal heatsink 32 has three portions: a straight channel portion 32a, a heat reservoir portion 32b, and a transition portion 32c connected between the straight channel portion 32a and the heat reservoir portion 32b. The width of the transition portion 32c gradually increases from one end connected with the straight channel portion 32a to the other end connected with the heat reservoir portion 32b. The straight channel portion 32a takes the role of a heat dissipation channel that carries heat away from the NFT 34, and the reservoir portion 32b acts as a spacious heat reservoir to temporarily store the heat which eventually will be dissipated into the whole EAMR head 30 and the environment.

In several embodiments, the NFT 34 has a disk shape, and the diameter of the NFT 34 is between about 200 nm and about 300 nm, and the straight channel portion 32a can be a little bit wider than the diameter of the NFT 34. For example, the straight channel portion 32a may have a width (W) between about 250 nm and about 500 nm. The length (L) of the straight channel portion 32a can be about 800 nm or more (e.g., a couple microns). In several embodiments, the full width at half maximum (FWHM) mode size of the adjacent waveguide 31 is between about 200 nm and about 300 nm, and the straight channel portion 32a may extend beyond the waveguide 31 by a distance (g) greater than about 600 nm so as to minimize or reduce the impact to the mode distribution inside the waveguide 31.

The heat reservoir portion 32b should be kept from the adjacent waveguide 31 at the distance (g) (e.g., 600 nm) similar to that of the straight channel portion 32a. In several embodiments, the heat reservoir portion 32b can be spaced from the waveguide 31 at a distance further than the distance (g). In FIGS. 2a-2c, the heat reservoir portion 32b has an opening which closely encloses a magnetic yoke 38, which links the writing pole 36 to a returning pole (not shown) under the waveguide 31. Thus, the heat reservoir portion 32b is effectively expanded if the yoke and the returning pole are considered as heat dissipators as well. The non-metal heatsink 32 may be made of any suitable non-metal materials or dielectric materials. Some suitable materials include AlN, BeO, BN, $Si_3N_4$, ZnS, $MgF_2$, $TeO_2$, etc. These materials all bear relatively higher thermal conductivity than normal cladding materials such as $SiO_2$ and $Al_2O_3$. However, the present invention is not limited to the above described materials. Other suitable non-metal materials may be used to make the heatsink 32.

In FIGS. 2a-2c, the straight channel portion 32a is below the writing pole 36 and is non-conformal to the writing pole 36. That is, the thickness (t) of the straight channel portion 32a does not vary in accordance with a side of the writing pole 36 facing the straight channel portion. In this embodiment, the straight channel portion 32a and the heat reservoir portion 32b have substantially the same thickness. The heat reservoir portion 32b is shown to have a rectangular block shape. However, the present invention is not limited thereto, and the heat reservoir portion 32b can have any suitable shapes. The heat reservoir portion 32b has a cavity 32c (see FIG. 2b) such that the yoke 38 can pass therethrough and connect with the returning pole. The cavity 32c can have any suitable shapes. For example, the cavity 32c has a rectangular shape (e.g., a window shape) in FIGS. 2a-2c. In one embodiment, the heat reservoir portion 32b has no cavity.

Still referring to FIGS. 2a-2c, the straight channel portion 32a has a rectangular block shape extending in the length (L) direction above the waveguide 31. The straight channel portion 32a has a beveled surface at one end thereof above the NFT 34, and the beveled surface abuts the writing pole 36 located above the straight channel portion 32a. In FIG. 2b, the heat reservoir portion 32b is connected with the straight channel portion 32a via a middle portion of the heatsink 32, which is narrower than the heat reservoir portion 32b, but wider than the straight channel portion 32a. One end of the middle portion tapers toward the straight channel portion 32a.

Figure 3:
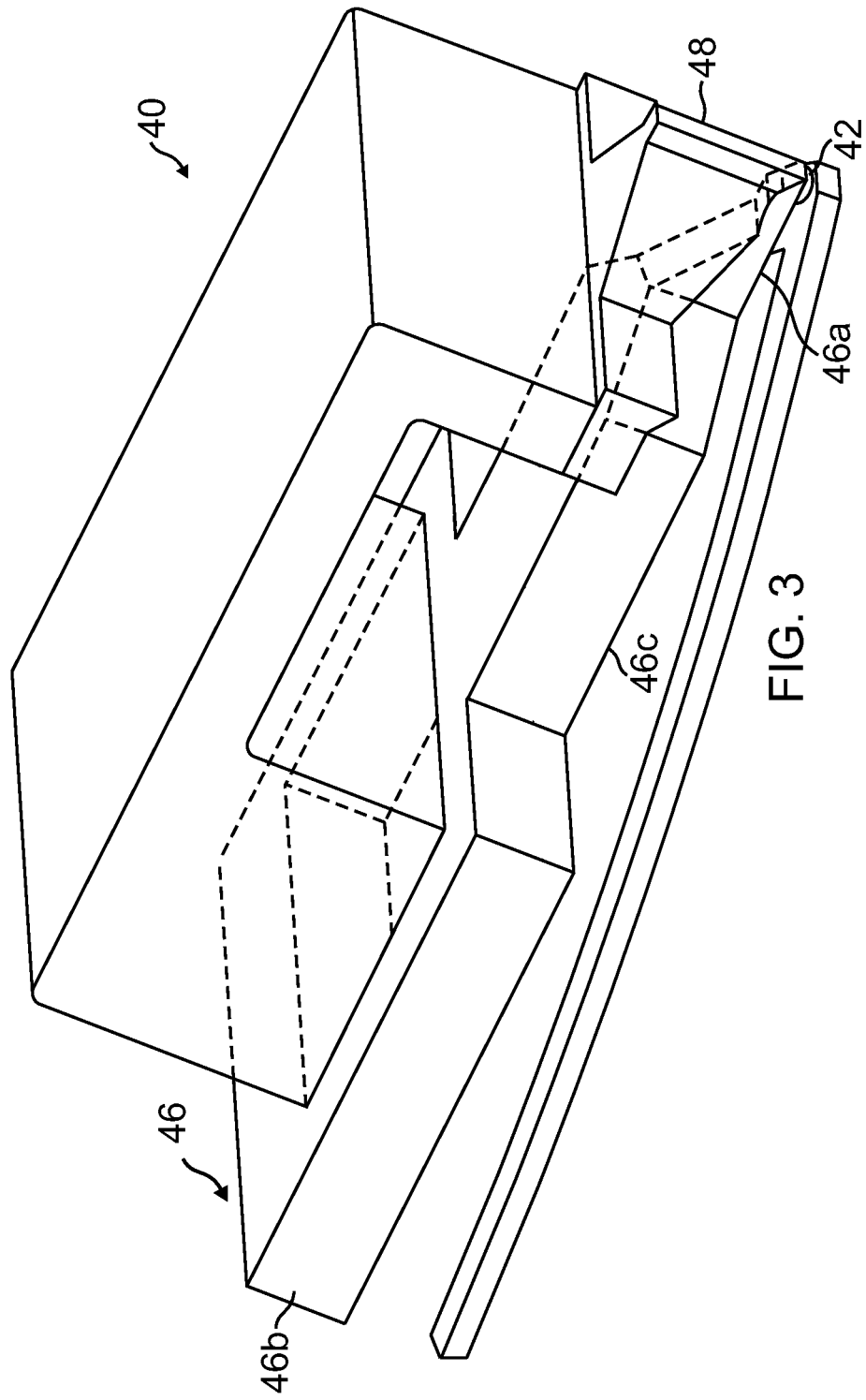
FIG. 3 is a perspective view of an EAMR head including an NFT with a non-metal heatsink according to a third embodiment of the present invention.

FIG. 3 is a perspective view illustrating an EAMR head 40 including an NFT with a non-metal heatsink according to a third embodiment of the present invention. The embodiment shown in FIG. 3 is substantially similar to the embodiment of FIGS. 2a-2c, except for the design of a non-metal heatsink. Therefore, the following discussion on the embodiment of FIG. 3 will be focused on the difference between the embodiments, and discussion of similar features will not be repeated.

In FIG. 3, the EAMR head 40 includes an NFT 42 formed on a waveguide 44. A non-metal heatsink 46 is positioned between the NFT 42 and a writing pole 48. The non-metal heatsink 46 has three portions: a straight channel portion 46a, a heat reservoir portion 46b, and a transition portion 46c connected between the straight channel portion 46a and the heat reservoir portion 46b. Here, the straight channel portion 46a is below the writing pole 48 and is conformal to the writing pole 48. That is, the thickness of the straight channel portion 46a varies such that the surface of the straight channel portion 46a facing the writing pole 48 conforms to the surface of the writing pole 48 facing the straight channel portion 46a. In this embodiment, the conformal straight channel portion 46a may be more effective in extracting the heat out of the NFT 42 and the tip region of the writing pole 48. The non-metal heatsink 46 has substantially the same shape in the plan view as the non-metal heatsink 32 of FIGS. 2a-2c, except that the non-metal heatsink 46 is generally thicker than the non-metal heatsink 32. In addition, the thickness of the straight channel portion 46a is gradually increased in a direction away from the NFT 42 to a certain distance. The width of the transition portion 46c gradually increases from one end coupled with the straight channel portion 46a to the other end coupled with the heat reservoir portion 46b.

To validate the above described non-metal heatsink design, optical modeling based on an AlN material has been conducted to evaluate the impact to NFT performance. The target is to maximize the absorption efficiency of the recording medium, so it is taken as the performance index of the system. On the other hand, the lifetime and reliability of the NFT are also considered. Therefore, the NFT should be effectively cooled because it has relatively strong light energy absorption. In addition, the writing pole is also highly absorptive. Therefore, the absorption of the NFT and the writing pole are two factors to be considered.

The optical modeling can be done with a finite difference time domain (FDTD) method. Assuming that the refractive index of the NFT has been switched from the lower index of the original cladding material (e.g., 1.65 for $Al_2O_3$ and 1.45 for $SiO_2$) to a higher index of about 2.14 for AlN, the NFT size is adjusted to keep it working at resonant status. If no AlN heatsink is used, the resonant NFT disk size is about 235 nm for a $SiO_2$ cladding, and the operating wavelength is 830 nm. If an AlN heatsink is used, the disk size is reduced to be about, for example, 200 nm for the same operating wavelength. In this optical modeling, the straight channel portion of the AlN heatsink is configured to have a width of about 300 nm, a length of about 1 μm, and a thickness of about 150 nm.

Figure 4A:
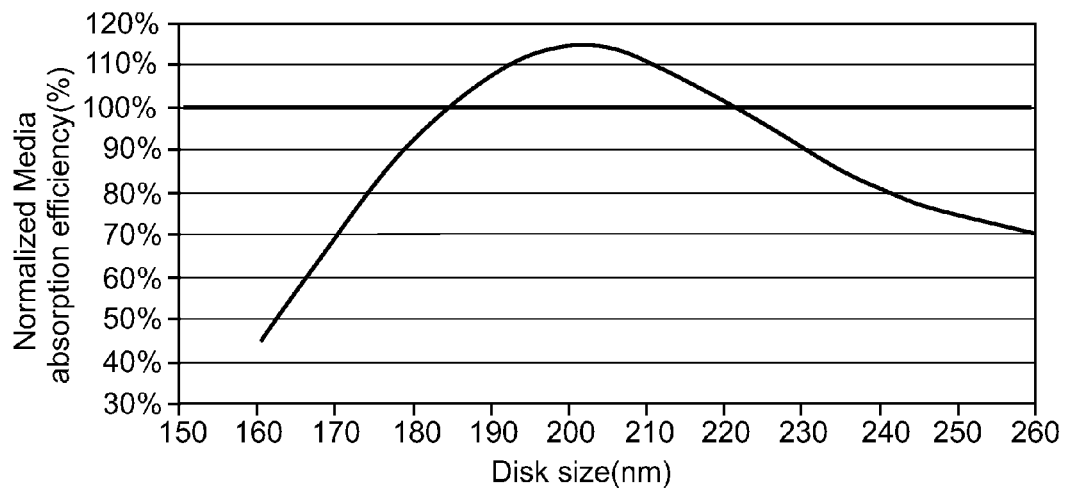
FIG. 4a illustrates the relationship between media absorption efficiency and NFT sizes according to various embodiments of the present invention.
Figure 4B:
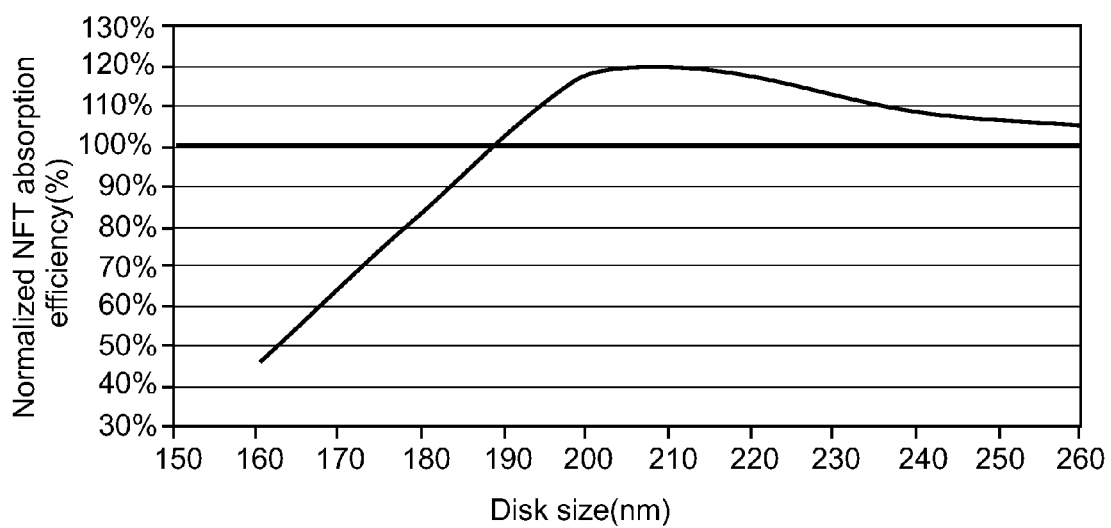
FIG. 4b illustrates the relationship between NFT absorption efficiency and NFT sizes according to various embodiments of the present invention.

FIG. 4a illustrates the relationship between normalized media absorption efficiency and NFT sizes according to various embodiments of the present invention. FIG. 4b illustrates the relationship between normalized NFT absorption efficiency and NFT sizes according to various embodiments of the present invention. Referring to FIGS. 4a and 4b, in comparison to the case of using a conventional metal heatsink, the peak media absorption efficiency shows about a 15% improvement when an AlN heatsink is used. The waveguide used in the optical modeling of FIGS. 4a and 4b includes a $SiO_2$ cladding and a $Ta_2O_5$ core.

Figure 5A:
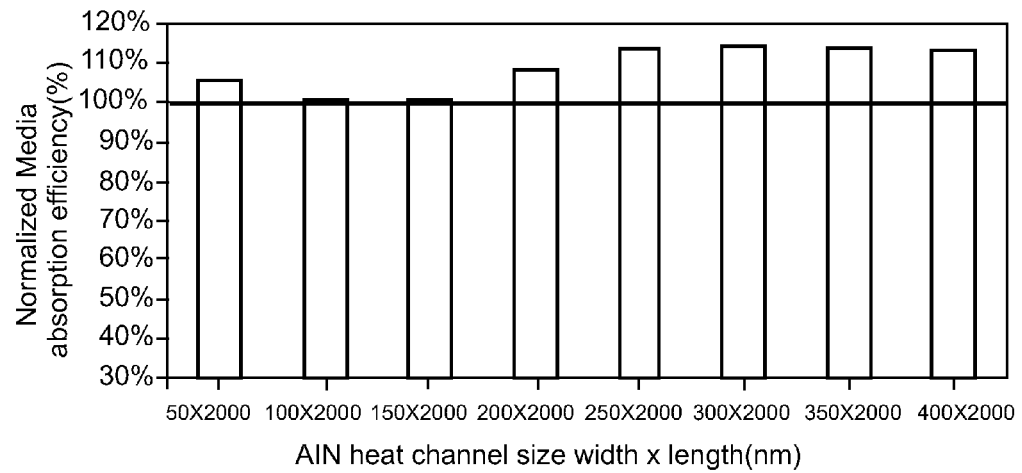
FIG. 5a illustrates the media absorption efficiency in relation to a width of the straight channel of an AlN heatsink having a fixed channel length according to several embodiments of the present invention.
Figure 5B:
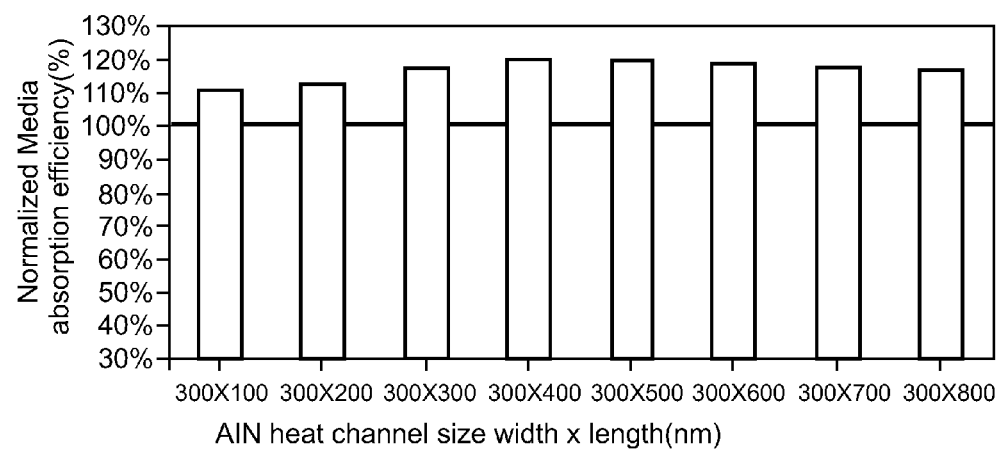
FIG. 5b illustrates the media absorption efficiency in relation to a straight channel length of an AlN heatsink having a fixed channel width according to several embodiments of the present invention.

FIG. 5a illustrates the normalized media absorption efficiency in relation to the width of a straight channel of an AlN heatsink having a fixed channel length of 2 μm. FIG. 5b illustrates the normalized media absorption efficiency in relation to the straight channel length of an AlN heatsink having a fixed channel width of 300 nm. The waveguide used in the optical modeling of FIGS. 5a and 5b includes a $SiO_2$ cladding and a $Ta_2O_5$ core. As shown in FIGS. 5a and 5b, the size of the straight channel of the AlN heatsink does not significantly alter the media absorption efficiency. FIG. 5a shows that when the width of the straight channel is between about 250 nm and about 500 nm, the media absorption efficiency is higher than a conventional configuration using a metal heatsink. In other words, the straight channel design of the AlN heatsink is very tolerable to process variations. In addition, the shape and size of the heat reservoir will not significantly alter the performance of the NFT if it is located suitably far away from the waveguide. That is, the design of the heat reservoir has some degree of freedom.

Figure 6:
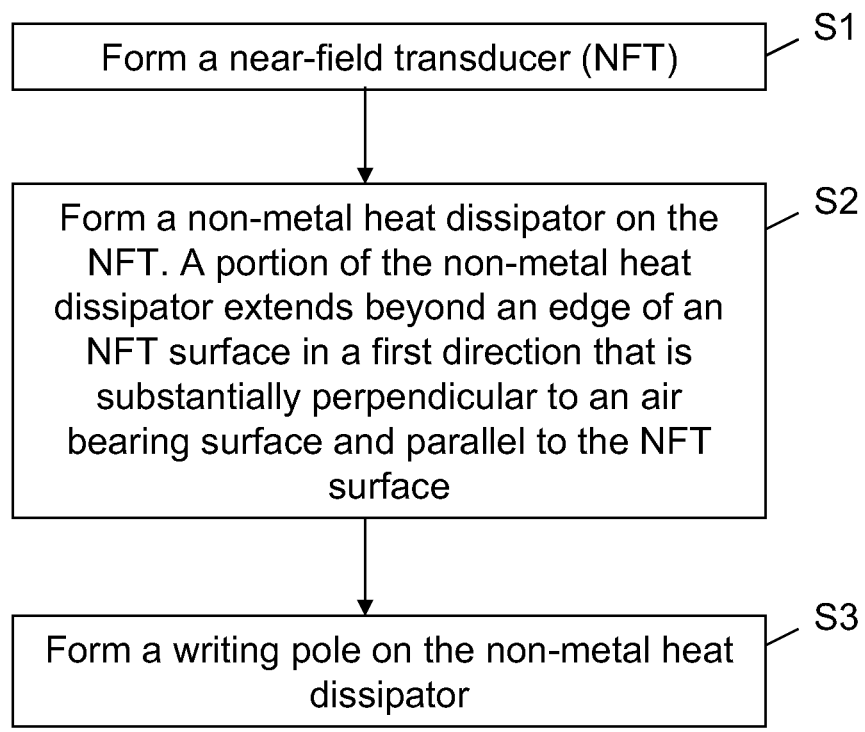
FIG. 6 is a flowchart illustrating a method for fabricating a recording head for energy assisted magnetic recording including an NFT with a non-metal heatsink according to one embodiment of the present invention.

FIG. 6 is a flowchart illustrating a method for fabricating a recording head for energy assisted magnetic recording including an NFT with a non-metal heatsink according to one embodiment of the present invention. Referring to FIG. 6, the method includes a number of processes. In step S1, a near-field transducer (NFT) is formed. The NFT has a preselected shape and a surface. In several embodiments, and prior to forming the NFT, a waveguide or core layer is formed and a spacer layer is on the core layer such that the spacer layer is positioned between the waveguide and the NFT. In step S2, a non-metal heat dissipator (e.g., heatsink or chimney) is formed on the surface of the NFT. The non-metal heat dissipator includes a first portion in contact with the NFT surface, and the first portion extends beyond an edge of the NFT surface in a first direction that is substantially perpendicular to an air bearing surface (ABS) and parallel to the NFT surface. In step S3, a writing pole is formed on the non-metal heat dissipator.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

According to the embodiments of the present invention, because a non-metal heatsink is used to replace a metal heatsink, a stop layer typically used in the fabrication of the metal heatsink can be avoided, and the non-metal heatsink can be substantially larger than the NFT. That is different from conventional metal heatsinks that have heat dissipation limitations that result from typically being smaller than the NFT. Several embodiments of the non-metal heatsink designs discussed herein can completely remove the stop layer and therefore reduce potential damage of the NFT during fabrication of the heatsink.

While the present invention has been particularly shown and described with reference to exemplary embodiments, it will be understood by those of ordinary skill in the art that various changes in form and details may be made therein without departing from the spirit and scope of the present invention as defined by the following claims and its equivalents.

What is claimed is:

1. A recording head for energy assisted magnetic recording comprising:
    a near-field transducer (NFT) having a preselected shape and a surface;
    a writing pole on the NFT; and
    a non-metal heat dissipator positioned between the NFT surface and the writing pole, the non-metal heat dissipator comprising a first portion in contact with the NFT surface, the first portion extending beyond an edge of the NFT surface in a first direction substantially perpendicular to an air bearing surface (ABS) and parallel to the NFT surface.

2. The recording head of claim 1, wherein the non-metal heat dissipator comprises a material selected from the group consisting of AlN, BeO, BN, Si3N4, ZnS, MgF2, and TeO2.

3. The recording head of claim 1, wherein the first portion has a width between about 250 nm and about 500 nm, inclusive, in a direction substantially parallel to the ABS and the NFT surface.

4. The recording head of claim 1, wherein the first portion has a length in the first direction that is larger than a length of the NFT in the first direction.

5. The recording head of claim 4, wherein the first portion has a length of at least about 800 nm in the first direction.

6. The recording head of claim 1, wherein a portion of the first portion is spaced apart from the writing pole.

7. The recording head of claim 1, wherein the non-metal heat dissipator further comprises a second portion extending from the first portion in the first direction, and a width of the second portion in a second direction substantially perpendicular to the first direction and parallel to the NFT surface is larger than that of the first portion.

8. The recording head of claim 7, wherein the first portion and the second portion have the same thickness.

9. The recording head of claim 7, wherein the first portion and the second portion have different thicknesses.

10. The recording head of claim 7, wherein the second portion has a proximal end connected with the first portion and a distal end, and the width of the second portion gradually increases in the second direction from the proximal end toward the distal end.

11. The recording head of claim 7, further comprising a waveguide core, wherein the NFT is positioned adjacent to the waveguide core, and the second portion of the non-metal heat dissipator is at least about 600 nm away from the waveguide core.

12. The recording head of claim 1, further comprising a magnetic yoke connected with the writing pole, wherein the non-metal heat dissipator is in contact with the magnetic yoke.

13. The recording head of claim 1, wherein the non-metal heat dissipator further comprises a second portion spaced apart from the NFT, the second portion having a preselected shape and a cavity.

14. The recording head of claim 13, wherein the second portion comprises a window frame shape.

15. The recording head of claim 1, wherein a surface of the non-metal heat dissipator conforms to a side of the writing pole.

16. The recording head of claim 15, wherein the first portion of the non-metal heat dissipator has a thickness that gradually increases in accordance with a surface of the side of the writing pole.

17. A method for fabricating a recording head for energy assisted magnetic recording, the method comprising:
    forming a near-field transducer (NFT) having a preselected shape and a surface;
    forming a non-metal heat dissipator on the NFT, the non-metal heat dissipator comprising a first portion in contact with the NFT surface, the first portion extending beyond an edge of the NFT surface in a first direction substantially perpendicular to an air bearing surface (ABS) and parallel to the NFT surface; and
    forming a writing pole on the non-metal heat dissipator, the non-metal heat dissipator being positioned between the writing pole and the NFT surface.

18. The method of claim 17, wherein the non-metal heat dissipator comprises a material selected from the group consisting of AlN, BeO, BN, Si3N4, ZnS, MgF2, and TeO2.

19. The method of claim 17, wherein the first portion has a width between about 250 nm and about 500 nm, inclusive, in a direction substantially parallel to the ABS and the NFT surface.

20. The method of claim 17, wherein the first portion has a length in the first direction that is larger than a length of the NFT in the first direction.

21. The method of claim 20, wherein the first portion has a length of at least about 800 nm in the first direction.

22. The method of claim 17, wherein a portion of the first portion is spaced apart from the writing pole.

23. The method of claim 17, wherein the non-metal heat dissipator further comprises a second portion extending from the first portion in the first direction, and a width of the second portion in a second direction substantially perpendicular to the first direction and parallel to the NFT surface is larger than that of the first portion.

24. The method of claim 23, wherein the first portion and the second portion have the same thickness.

25. The method of claim 23, wherein the first portion and the second portion have different thicknesses.

26. The method of claim 23, wherein the second portion has a proximal end connected with the first portion and a distal end, and the width of the second portion gradually increases in the second direction from the proximal end toward the distal end.

27. The method of claim 23, further comprising forming a waveguide core adjacent to the NFT, wherein the second portion of the non-metal heat dissipator is at least about 600 nm away from the waveguide core.

28. The method of claim 17, further comprising forming a magnetic yoke connected with the writing pole, wherein the non-metal heat dissipator is in contact with the magnetic yoke.

29. The method of claim 17, wherein the non-metal heat dissipator further comprises a second portion spaced apart from the NFT, the second portion having a preselected shape and a cavity.

30. The method of claim 29, wherein the second portion comprises a window frame shape.

31. The method of claim 17, wherein a surface of the non-metal heat dissipator conforms to a side of the writing pole.

32. The method of claim 31, wherein the first portion of the non-metal heat dissipator has a thickness that gradually increases in accordance with a surface of the side of the writing pole.

* * * * *